United States Patent
Hsieh et al.

(10) Patent No.: US 11,115,650 B2
(45) Date of Patent: Sep. 7, 2021

(54) SYSTEM AND METHOD FOR MONITORING VIDEO COMMUNICATION DEVICE

(71) Applicant: Acer Incorporated, New Taipei (TW)

(72) Inventors: Ming-Feng Hsieh, New Taipei (TW);
Sheng-Yu Weng, New Taipei (TW);
Chun-Chih Kuo, New Taipei (TW);
Chih-Cheng Chen, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 16/780,906

(22) Filed: Feb. 4, 2020

(65) Prior Publication Data
US 2021/0195169 A1    Jun. 24, 2021

(30) Foreign Application Priority Data
Dec. 20, 2019 (TW) .................. 108146810

(51) Int. Cl.
*H04N 17/00* (2006.01)
*G08B 7/06* (2006.01)
*H04N 7/14* (2006.01)

(52) U.S. Cl.
CPC ............. *H04N 17/002* (2013.01); *G08B 7/06* (2013.01); *H04N 7/147* (2013.01)

(58) Field of Classification Search
None
See application file for complete search history.

(56) References Cited

U.S. PATENT DOCUMENTS

| | | | |
|---|---|---|---|
| 2013/0257447 A1* | 10/2013 | Kitaura | G01R 31/50 324/537 |
| 2014/0082385 A1* | 3/2014 | Reule | G06F 1/3268 713/320 |
| 2015/0097918 A1* | 4/2015 | Kang | H04N 21/4542 348/14.07 |
| 2020/0234659 A1* | 7/2020 | Ju | G01J 1/124 |

FOREIGN PATENT DOCUMENTS

| | | |
|---|---|---|
| CN | 101593014 | 9/2012 |
| CN | 202583359 | 12/2012 |
| TW | M397664 | 2/2011 |
| TW | 201339832 | 10/2013 |

\* cited by examiner

*Primary Examiner* — Stella L. Woo
(74) *Attorney, Agent, or Firm* — JCIPRNET

(57) ABSTRACT

A system and a method for monitoring a video communication device configured to monitor an activation state of a video capturing module are provided. A detection circuit is configured to detect an operation current input to the video capturing module. A control circuit is electrically connected to the detection circuit and determines whether the video capturing module is activated according to a magnitude of the operation current.

7 Claims, 3 Drawing Sheets

SYSTEM AND METHOD FOR MONITORING VIDEO COMMUNICATION DEVICE

CROSS-REFERENCE TO RELATED APPLICATION

This application claims the priority benefit of Taiwan patent application serial no. 108146810, filed on Dec. 20, 2019. The entirety of the above-mentioned patent application is hereby incorporated by reference herein and made a part of this specification.

BACKGROUND

Technical Field

The disclosure relates to a security management technology, and in particular to a system and a method for monitoring a video communication device.

Description of Related Art

In recent years, people have become accustomed to the use of electronic devices for remote video communication and to bridge the gap and reduce the distance between people. In addition, with the popularity of online social networking, people may directly do live-streams through the video communication devices of the electronic devices or record their own videos and share them on the Internet. On the other hand, however, public awareness about privacy and security has also been raised. Users may inadvertently disclose personal information because they accidentally touch and activate the video communication device. What is more, cyber attackers may gain unauthorized access to the users' electronic devices for malicious peeping or record the users' private activities. Therefore, how to ensure the security of the video communication devices of the electronic devices has become an important issue.

SUMMARY

The disclosure provides a system and a method for monitoring a video communication device, whereby an activation state of the video communication device may be monitored, so as to ensure the privacy and security of a user.

In an embodiment of the disclosure, a system for monitoring a video communication device is provided. The system includes a video capturing module, a detection circuit, and a control circuit. The detection circuit is configured to detect an operation current input to the video capturing module. The control circuit is electrically connected to the detection circuit, and determines whether the video capturing module is activated according to a magnitude of the operation current.

In an embodiment of the disclosure, a method for monitoring a video communication device is provided. The method including following steps: detecting an operation current input to a video capturing module, determining whether the video capturing module is activated according to the operation current, and correspondingly issuing an alert signal to notify a user that the video capturing module has been activated.

In an embodiment of the disclosure, a system for monitoring a video communication device is provided. The system includes a video capturing module, a power module, and a control circuit. The power module is configured to provide an operation current to the video capturing module. The switch circuit is coupled between the power module and the video capturing module and selectively switched on or off according to an activation signal input by a user. The control circuit is electrically connected to the switch circuit, and configured to determine whether the video capturing module is activated according to whether the switch circuit is switched on or off.

In an embodiment of the disclosure, a method for monitoring a video communication device is provided. The method including following steps: inputting an activation signal by a user; selecting to switch on a switch circuit or not according to the activation signal, wherein the switch circuit is coupled between a power module and a video capturing module to control whether to provide power to the video capturing module; determining whether the video capturing module is activated according to whether the switch circuit is switched on or off.

In view of the above, embodiments of the disclosure provide the system and the method for monitoring the video communication device to determine whether to activate the video communication device according to the actual operation state of the video communication device, so as to monitor the activation state of the video communication device and ensure the privacy and security of the user.

Several exemplary embodiments accompanied with figures are described in detail below to further describe the disclosure in details.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles described herein.

DESCRIPTION OF THE EMBODIMENTS

Figure 1:
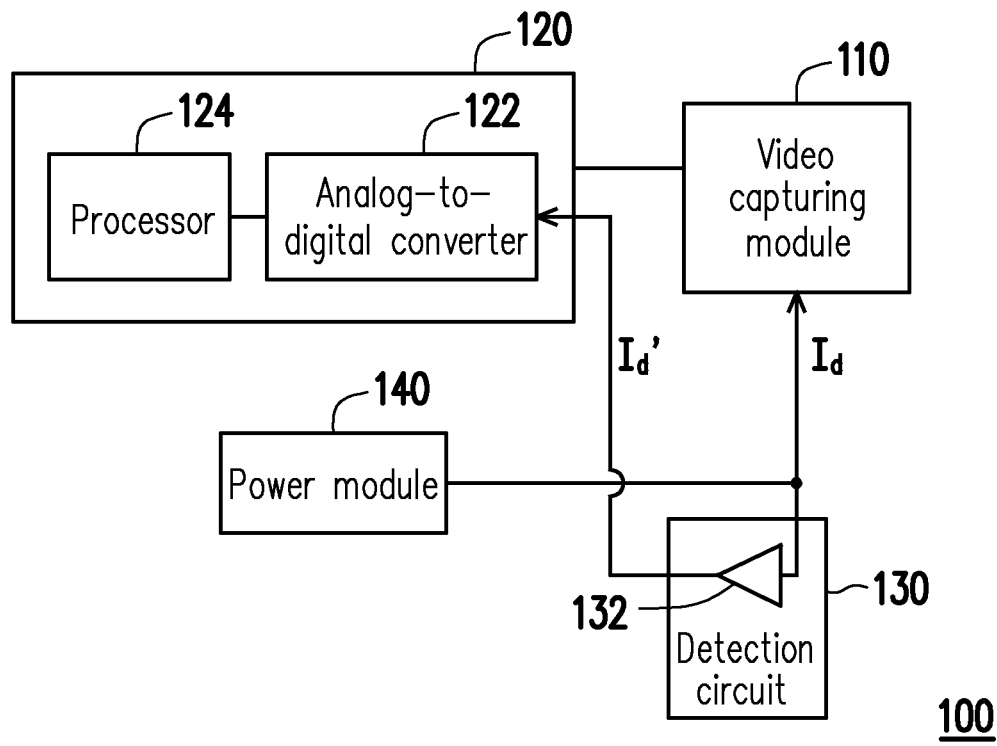
FIG. 1 is a schematic diagram of a system for monitoring a video communication device according to an embodiment of the disclosure.

FIG. 1 is a schematic diagram of a system for monitoring a video communication device according to an embodiment of the disclosure. With reference to FIG. 1, a system 100 for monitoring a video communication device includes a video capturing module 110, a control circuit 120, and a detection circuit 130. The system 100 may be installed on various electronic devices, such as a notebook computer, a personal computer, or a mobile phone. The video capturing module 110 is, for instance, a camera or a microphone. Users use the video capturing module 110 to capture videos or audios. The video communication device communicates on the network through the videos or audios provided by the video capturing module 110.

In this embodiment, the system 100 further includes a power module 140. The power module 140 provides an operation current Id to the video capturing module 110 to activate the video capturing module 110. The detection circuit 130 is configured to detect the operation current Id input to the input video capturing module 110. The control circuit 120 is electrically connected to the detection circuit 130, and determines whether the video capturing module 110 is activated according to a magnitude of the operation current Id.

Specifically, when the video capturing module 110 is in a suspended mode or a closed mode, the video capturing module 110 does not shoot. The video capturing module 110 may only receive the weak operation current Id. At this time, the operation current Id is 1 mA, for instance. However, when the video capturing module 110 is in an operating mode, the video capturing module 110 starts shooting and generates video communication data. At this time, the operation current Id is increased to, for instance, 200 mA.

Generally, the operation current Id of the video capturing module 110 provided by the electronic device need not be excessively strong, and the variation range of the magnitude of the operation current Id is small, for instance, from 100 mA to 200 mA described above. Therefore, the direct determination of the change of the operation current Id by the control circuit 120 may be inaccurate.

To avoid the inaccurate determination, the detection circuit 130 includes an amplifier 132. The amplifier 132 is configured to amplify the operation current Id. The control circuit 120 may determine whether the video capturing module 110 is activated according to the amplified operation current Id'. In this embodiment, the control circuit 120 includes an analog-to-digital converter 122 and a processor 124. Specifically, the control circuit 120 may implement the analog-to-digital converter 122 in form of an analog-to-digital converter of an embedded controller. The processor 124 may be a hardware device, such as a central processing unit (CPU), a microprocessor, or a microcontroller unit (MCU). The analog-to-digital converter 122 receives the amplified operation current Id', and the processor 124 determines whether the video capturing module 110 is activated according to an output result of the analog-to-digital converter 122. For instance, when the amplified operation current Id' is greater than or equal to a threshold value, the analog-to-digital converter 122 correspondingly outputs logic "1", indicating that the video capturing module 110 is in the operating mode; when the amplified operation current Id' is less than the threshold value, the analog-to-digital converter 122 correspondingly outputs logic "0", indicating that the video capturing module 110 is in the suspended mode or the closed mode.

In this embodiment, when the processor 124 determines that the video capturing module 110 is activated, the processor 124 controls an alert device to issue an alert signal. The alert device may be a display, a light signal, or a speaker, and the alert signal may be a pop-up window, light, or a warning sound, which should however not be construed as a limitation in the disclosure. In an embodiment, when the processor 124 determines that the video capturing module 110 is activated, the processor 124 sends a notification message. The notification message is displayed on a screen to inform the user of the fact that the video capturing module 110 is switched on.

Figure 2:
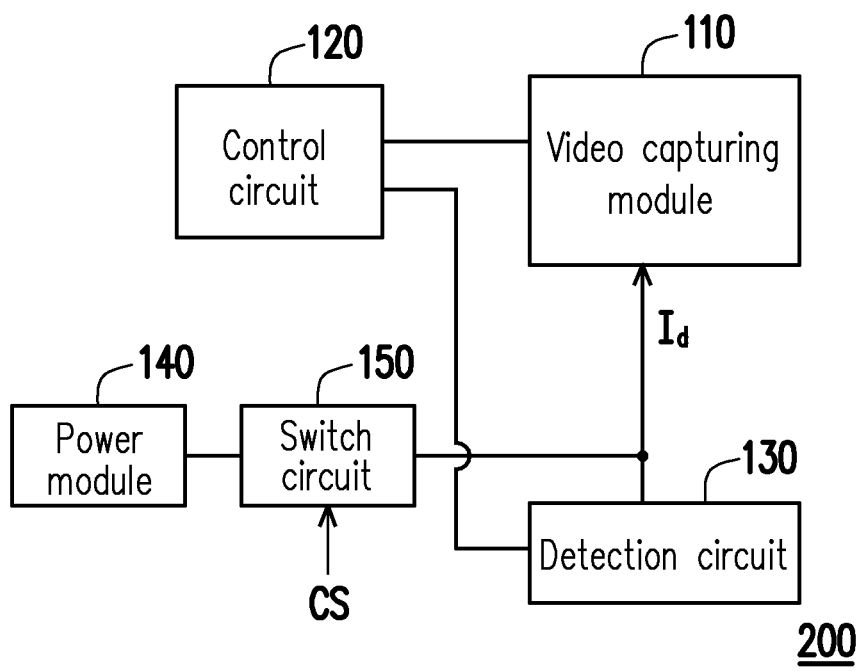
FIG. 2 is a schematic diagram of a system for monitoring a video communication device according to another embodiment of the disclosure.

FIG. 2 is a schematic diagram of a system for monitoring a video communication device according to another embodiment of the disclosure. With reference to FIG. 2, in addition to the video capturing module 110, the control circuit 120, and the detection circuit 130, the system 200 for monitoring a video communication device also includes a switch circuit 150. The switch circuit 150 is coupled between the power module 140 and the video capturing module 110, and is selectively switched on or off according to an activation signal CS input by the user.

In this embodiment, the user may input the activation signal CS through an input device, such as a keyboard or a mouse, so as to activate or deactivate the video capturing module 110. When the user chooses to activate the video capturing module 110, the switch circuit 150 is switched on by the activation signal CS, and the power module 140 may provide power to the video capturing module 110. When the user deactivates the video capturing module 110, the switch circuit 150 is switched off according to the activation signal CS, and the power module 140 is unable to provide power to the video capturing module 110, so that the video capturing module 110 is in the closed state. When the switch circuit 150 is switched off, the video capturing module 110 is not activated, so as to reduce the possibility that the user accidentally touches and activates the video capturing module 110.

In this embodiment, the control circuit 120 may also detect the operation current Id actually input to the video capturing module 110 through the detection circuit 130, so as to be certain about whether the switch circuit 150 is indeed switched off or on. Reference of the implementation manner may be made to the embodiment depicted in FIG. 1. Through the dual protection, i.e., controlling the power supplied to the video capturing module 110 and detecting the operation current Id, the system 200 may prevent the user from accidentally activating the video capturing module 110 and prevent hackers from switching on the switch circuit 150 without permission, ensuring both security and privacy protection.

Figure 3:
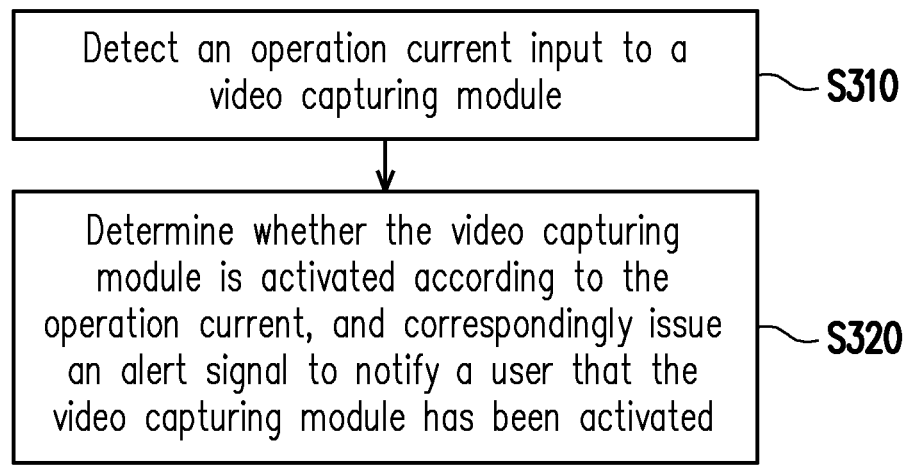
FIG. 3 is a flowchart of a method for monitoring a video communication device according to an embodiment of the disclosure.

FIG. 3 is a flowchart of a method for monitoring a video communication device according to an embodiment of the disclosure. The method 300 may be adapted to the embodiments depicted in FIG. 1 to FIG. 2. In step S310, the detection current is configured to detect the operation current input to the video capturing module. In step S320, the control circuit determines whether the video capturing module is activated according to the operation current, and correspondingly issues the alert signal to notify the user that the video capturing module has been activated. Reference of the implementation details of the method 300 may be made to the embodiments depicted in FIG. 1 to FIG. 2 to obtain sufficient suggestions, teachings, or descriptions, and thus no further explanation will be provided hereinafter.

Figure 4:
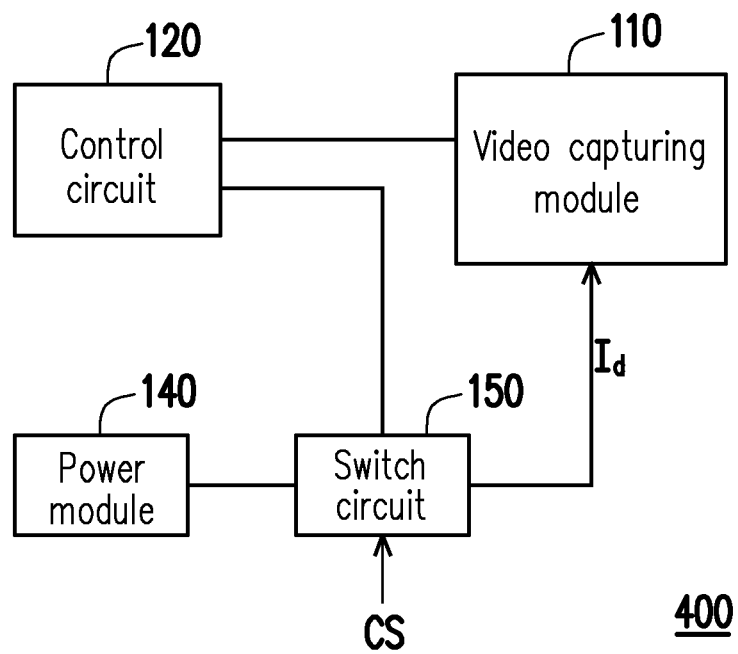
FIG. 4 is a schematic diagram of a system for monitoring a video communication device according to another embodiment of the disclosure.
Figure 5:
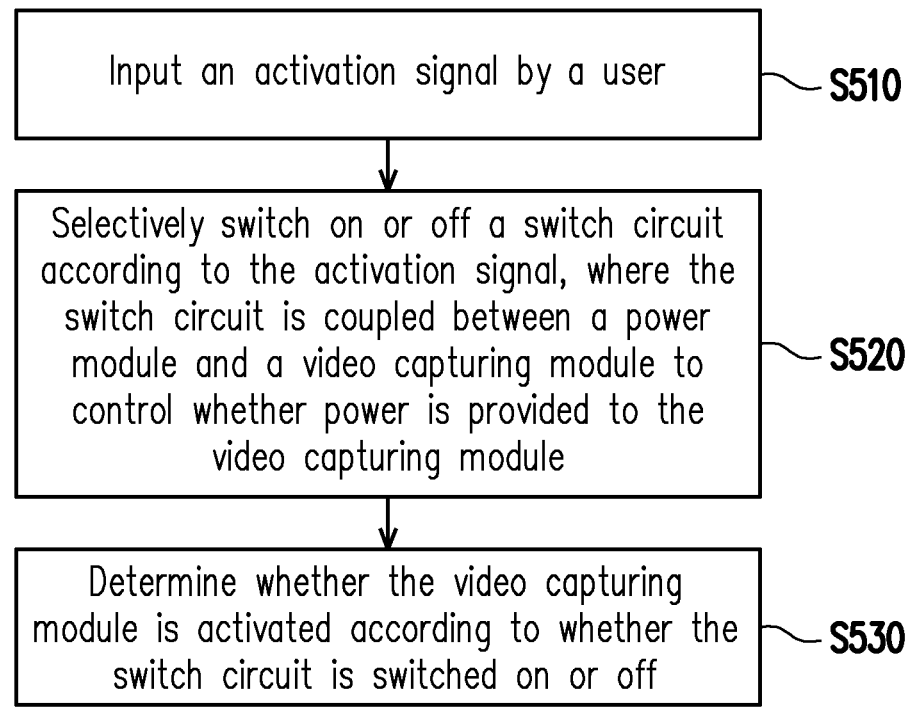
FIG. 5 is a flowchart of a method for monitoring a video communication device according to another embodiment of the disclosure.

FIG. 4 is a schematic diagram of a system for monitoring a video communication device according to another embodiment of the disclosure; FIG. 5 is a flowchart of a method for monitoring a video communication device according to another embodiment of the disclosure. The method 500 may be adapted to the embodiment depicted in FIG. 4. With reference to FIG. 4 and FIG. 5, the system 400 is similar to the system 200, but the system 400 may not include the detection circuit 130; instead, in the system 400, the video capturing module 110 is activated or deactivated merely through the control by the switch circuit 150. In step S510, the activation signal CS is input by the user, and then in step S520, the switch circuit 150 is selectively switched on or off according to the activation signal CS. The switch circuit 150 is coupled between the power module 140 and the video capturing module 110 to control whether power is provided to the video capturing module 110. Next, in step S530, the control circuit 120 is electrically connected to the switch circuit 150 or receives the activation signal CS to determine whether the video capturing module 110 is activated according to whether the switch circuit 150 is switched on or off. Reference of the implementation details of the method 500 may be made to the embodiments of the system 200 to obtain sufficient teachings, and thus no further explanation will be provided hereinafter.

Figure 6:
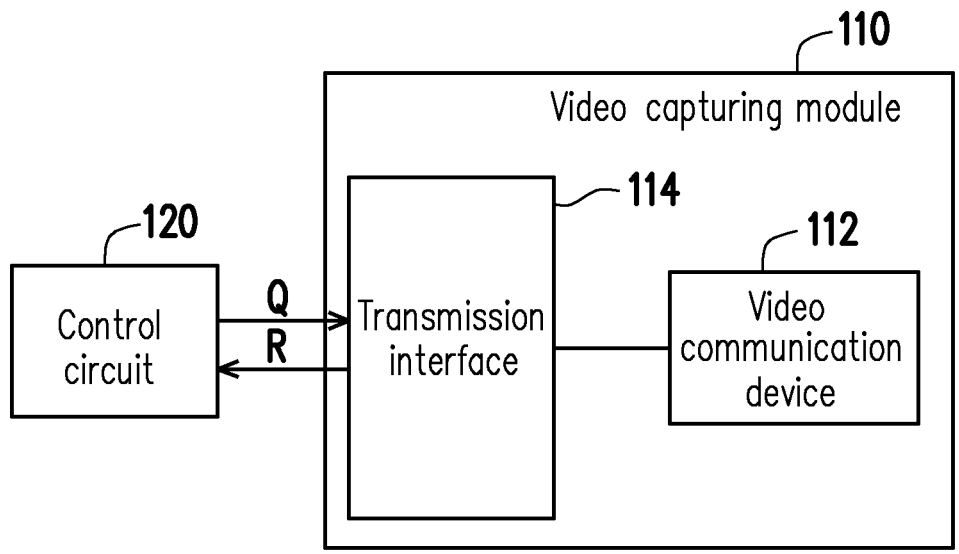
FIG. 6 is a schematic partial diagram of a system for monitoring a video communication device according to another embodiment of the disclosure.

FIG. 6 is a schematic partial diagram of a system for monitoring a video communication device according to another embodiment of the disclosure. With reference to FIG. 6, this embodiment may be implemented alone or in combination with the above embodiments. The video capturing module 110 provided in this embodiment includes a video communication device 112 and a transmission interface 114. The video communication device 112 is, for instance, a camera device and generates video communication data. The transmission interface 114 is, for instance, a universal serial bus interface, which should however not be construed as a limitation in the disclosure. The video communication device 112 receives the operation current Id through the transmission interface 114 or outputs the video communication data. When the video capturing module 110 is not activated, the video capturing module 110 merely receives the weak operation current Id to maintain the suspended mode, or it cannot receive the operation current Id and is in the closed state. However, when the video capturing module 110 is in the operating mode, the video communication device 112 is driven to start capturing images and generate the video communication data.

In this embodiment, the control circuit 120 is electrically connected to the video capturing module 110 and periodically sends a request command Q to the transmission interface 114 to query the data traffic output by the transmission interface 114. The transmission interface 114 transmits the reply command R back to the control circuit 120 in response to the request command Q. The control circuit 120 determines the data traffic of the transmission interface 114 according to the reply command R. If the data traffic of the transmission interface 114 increases, e.g., if the data traffic starts to exceed a certain amount (i.e., a reference amount) or the transmission interface 114 continues to output the video communication data, the control circuit 120 determines that the video capturing module 110 is activated accordingly. By continuously and periodically monitoring the data traffic output by the video capturing module 110, it is determined whether the video capturing module 110 is activated.

To sum up, according to the system and method for monitoring the video communication device provided in one or more embodiments of the disclosure, the activation state of the video capturing module may be correctly monitored by detecting the operation current of the video capturing module and the video communication data traffic, or by controlling the power supply through the switch circuit, so as to avoid videos or images from being recorded without the user's knowledge and achieve security and privacy protection.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A system for monitoring a video communication device, the system comprising:
a video capturing module;
a detection circuit configured to detect an operation current input to the video capturing module; and
a control circuit electrically connected to the detection circuit and determining whether the video capturing module is activated according to a magnitude of the operation current,
wherein the video capturing module comprises:
the video communication device; and
a transmission interface configured to output video communication data generated by the video communication device,
wherein the control circuit periodically sends a request command to the transmission interface and determines a data traffic of the transmission interface according to a reply command transmitted back by the transmission interface,
wherein when the data traffic of the transmission interface increases, the control circuit determines that the video capturing module is activated.

2. The system according to claim 1, wherein the detection circuit comprises an amplifier configured to amplify the operation current, and the control circuit determines whether the video capturing module is activated according to the amplified operation current.

3. The system according to claim 2, wherein the control circuit comprises an analog-to-digital converter and a processor, the analog-to-digital converter receives the amplified operation current, and the processor determines whether the video capturing module is activated according to an output result of the analog-to-digital converter,
wherein when the processor determines that the video capturing module is activated, the processor controls an alert device to issue an alert signal.

4. The system according to claim 1, further comprising:
a power module configured to provide the operation current; and
a switch circuit coupled between the power module and the video capturing module and selectively switched on or off according to an activation signal input by a user.

5. A method for monitoring a video communication device, the method comprising:
detecting an operation current input to a video capturing module; and
determining whether the video capturing module is activated according to the operation current, and correspondingly issue an alert signal to notify a user that the video capturing module is activated,
wherein the video capturing module comprises:
the video communication device; and
a transmission interface configured to output video communication data generated by the video communication device,
wherein the video communication device periodically sends a request command to the transmission interface, and determines whether a data traffic of the transmission interface is changed according to a reply command transmitted back by the transmission interface, and
when the data traffic of the transmission interface increases, the control circuit determines that the video capturing module is activated.

6. A system for monitoring a video communication device, the system comprising:
- a video capturing module;
- a power module configured to provide an operation current to the video capturing module;
- a switch circuit coupled to the power module and the video capturing module, and selectively switched on or off according to an activation signal input by a user; and
- a control circuit electrically connected to the switch circuit, and configured to determine whether the video capturing module is activated according to whether the switch circuit is switched on or off,
- wherein the video capturing module comprises:
- the video communication device; and
- a transmission interface configured to output video communication data generated by the video communication device,
- wherein the control circuit periodically sends a request command to the transmission interface, and determines whether a data traffic of the transmission interface is changed according to a reply command transmitted back by the transmission interface, and
- when the data traffic of the transmission interface increases, the control circuit determines that the video capturing module is activated.

7. The system according to claim 6, further comprising:
- a detection circuit electrically connected to the control circuit and configured to detect the operation current input to the video capturing module,
- wherein the control circuit further determines whether the video capturing module is activated according to a magnitude of the operation current.

* * * * *